(No Model.) 6 Sheets—Sheet 3.

W. C. CHURCH.
STEAM OR OTHER MOTIVE FLUID ENGINE.

No. 519,238. Patented May 1, 1894.

(No Model.) 6 Sheets—Sheet 4.

W. C. CHURCH.
STEAM OR OTHER MOTIVE FLUID ENGINE.

No. 519,238. Patented May 1, 1894.

FIG. 4.

(No Model.) 6 Sheets—Sheet 5.

W. C. CHURCH.
STEAM OR OTHER MOTIVE FLUID ENGINE.

No. 519,238. Patented May 1, 1894.

Inventor:
Walter Charles Church by
his attorneys.

Attest (No Model.) 6 Sheets—Sheet 6.

W. C. CHURCH.
STEAM OR OTHER MOTIVE FLUID ENGINE.

No. 519,238. Patented May 1, 1894.

Attest:
A. A. Erb.
Henry Lewis

Inventor:
Walter Charles Church by
Pollok & Mauro
his attorneys

THE NATIONAL LITHOGRAPHING COMPANY,
WASHINGTON, D. C.

United States Patent Office.

WALTER C. CHURCH, OF LONDON, ENGLAND.

STEAM OR OTHER MOTIVE-FLUID ENGINE.

SPECIFICATION forming part of Letters Patent No. 519,238, dated May 1, 1894.

Application filed June 14, 1893. Serial No. 477,516. (No model.)

*To all whom it may concern:*

Be it known that I, WALTER CHARLES CHURCH, engineer, a subject of the Queen of Great Britain and Ireland, residing at No. 6 Trinity Square, Brixton, London, in the county of Surrey, England, have invented certain Improvements in or Connected with Steam and other Motive-Fluid Engines, of which the following is a specification.

My invention relating to steam and other motive fluid engines has for its object to provide means whereby steadiness in the movement of the working parts is insured, friction reduced, and economy of motive fluid and increased power obtained. In compound steam-engines I arrange a high-pressure cylinder, or a pair of high-pressure cylinders, by the side or sides of a low or lower-pressure cylinder of considerably greater diameter than that of the high-pressure cylinder or cylinders, and I provide each of the cylinders with a valve, arranged to have steam admitted to its internal cavity or cavities, and exhaust into the valve chest or case. The high-pressure valve chest or chests communicates or communicate directly with a port or passage, or with ports or passages, leading into the cavity or cavities of the low or lower-pressure slide valve. As applied to steam engines generally, I construct the chests or cases containing the valves in such a manner that ready egress of the water is obtained, so that comparatively dry valve chests or cases are maintained. For this purpose I make the lower side or bottom of the valve chest inclined toward the exhaust outlet; for instance, in the case of compound engines, I make the lower side or bottom of the valve chest of the high-pressure cylinder to incline toward an outlet or exhaust which communicates with a passage leading into the interior cavity in the valve of the low or lower-pressure cylinder, through which passage the water from the said valve chest or casing passes with the exhaust steam from the high-pressure cylinder into the cavity or cavities in the valve of the low or lower-pressure cylinder, whence it passes into the low or lower-pressure cylinder, and out therefrom into the valve chest or case of the said low or lower-pressure cylinder. The lower side or bottom of this valve chest or case is also inclined toward an outlet or exhaust leading to the atmosphere, or to a condenser, according to whether the engine is worked as a non-condensing or a condensing engine. From this arrangement it follows that, as the high-pressure piston makes its stroke (or the high-pressure pistons make their strokes) subject to the high pressure on its or their one side or sides of steam from the boiler, the exhaust steam from its or their other side or sides, acts on the low or lower-pressure piston to move it in the same direction as that in which the high-pressure piston or pistons is or are moving; and, as there is no compressing of the steam into a reservoir or receiver, there is not that loss of power which occurs in ordinary compound engines, due to the compressing of the steam into the receiver during the portion of the stroke of the high-pressure piston before the exhaust is closed and also to the increasing compression of steam as the piston completes its stroke after the exhaust passage has been closed. When the cylinders are above the crank, and the invention is applied to condensing engines, I prefer to attach to the rod of the low-pressure slide valve a piston working in a cylinder below the valve case, the outer end of this cylinder being in communication with the atmosphere. As the pressure in the valve chest is considerably below that of the atmosphere, the excess of outside pressure sustains the weight of the slide valve or valves. This, it is obvious, is also applicable when the cylinders are below the crank, and to low-pressure slide valves or piston valves of condensing engines generally. Either slide valves, piston valves, or other suitable valves may be employed for one or the other or for all the cylinders.

The particular improvement in compound engines as herein described, wherein both the high and low pressure pistons make their strokes together in the same direction, is especially adapted for use where it is desired to connect all the piston rods, of both high and low pressure cylinders, to a single cross-head which is in turn connected to a single crank on the main shaft. In most compound engines having separate piston rods for each piston, the latter do not make their strokes together in the same direction, and could not therefore be attached to a single cross-head under any circumstances. The valves for the respective cylinders may be operated separately or I may connect the valve rods of both high and low pressure cylinders to a single cross-head driven by an eccentric or eccentrics or other operating device. The construction and arrangement of the cross-head, its connections and accessory parts and also the valve operating connections are fully described and claimed in my application, filed November 11, 1893, Serial No. 490,599, and these parts will only be described herein so far as to show the special adaptability of the invention set forth in this application to mechanism of that particular character.

Two or more sets of cylinders such as herein described may be arranged to work several cranks on one shaft.

In rectangular slide valves of steam engines, in which the live steam is admitted to the interior thereof, I provide a cap which fits over the back of the valve and has a rectangular bearing surface which bears against the internal surface of the valve chest or case. The rectangular form of the face of this cap affords a greater bearing surface for a given sized valve than would be the case if the surface be circular, while the friction of the rubbing surfaces is reduced, owing to the increased area of the rectangular form over that of the circular form, and at the same time it admits of the width of the valve chest or casing being made narrower or reduced in size. And, in order that my invention may be well understood, I will further describe the same, with reference to the accompanying drawings, as applied to a compound steam engine containing one high pressure cylinder and one low pressure cylinder, it being understood, however, that the invention is also applicable to engines containing more than two cylinders and partly to single-cylinder engines.

Fig. 2 is a part plan, and part horizontal section taken along the line $a\,b$, Figs. 1 and 4. Fig. 2$^a$ is a detail of the cross-head for the valve rods. Fig. 21 is an elevation and Fig. 22 a section of the spring packing ring interposed between the back of the low pressure valve and its cap.

Figure 5:
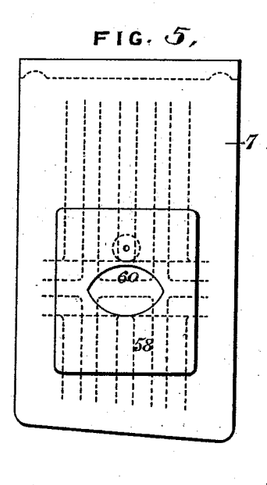
Figs. 5 and 6 are views of the interiors of the covers of the high and low-pressure valve boxes or cases respectively.
Figure 6:
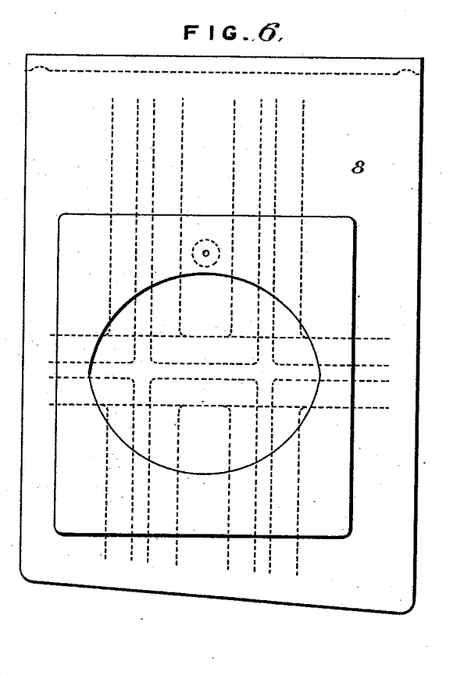
Figure 7:
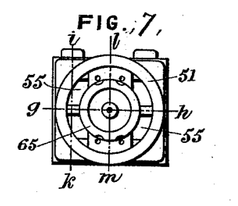
Fig. 7 is a view of the back of the high-pressure valve with the cap removed.
Figure 8:
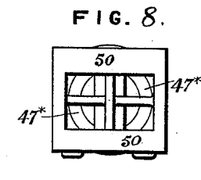
Fig. 8 is a view of the face of the high-pressure valve.

Referring to Figs. 1, 2, 3 and 4, 1 is the high pressure cylinder, and 2 is the lower pressure cylinder. These cylinders are arranged side by side or parallel to each other, and may be cast together as shown, or they may be each cast separately, and be connected together by any suitable means. The lower pressure cylinder is of such considerably greater diameter than the high pressure cylinder as to utilize, as far as practicable, the pressure of the steam which passes directly into it from the high pressure cylinder. For example, in the engine illustrated the diameter of the low pressure cylinder is four times that of the diameter of the high pressure cylinder, and consequently about sixteen times the area, the boiler pressure being presumed to be two hundred and fifteen pounds per square inch, but the proportions will, of course, vary according to the boiler pressure for which the engine is designed, and according to the class of engine and the purpose for which it is to be used. When the engine is making sixty revolutions per minute, the steam occupies only about one second in passing through both cylinders to the atmosphere or condenser, as the case may be, and therefore loss by condensation is greatly reduced. 3 is the chest or casing containing the high pressure slide valve 4, and 5 is the chest or casing containing the valve 6 of the lower pressure cylinder. These valve chests or casings may be cast in one with the cylinders, and be provided with covers 7 and 8 shown detached in Figs. 5 and 6, or they may be cast separately and connected to the cylinders, in which case the loose covers 7 and 8 may be dispensed with. The pistons 9 and 10 of the high and the lower pressure cylinder are connected by their rods 11 and 12 to gudgeons 13 and 14 mounted in a crosshead 15, which construction and arrangement are fully described in my aforesaid application.

Figure 1:
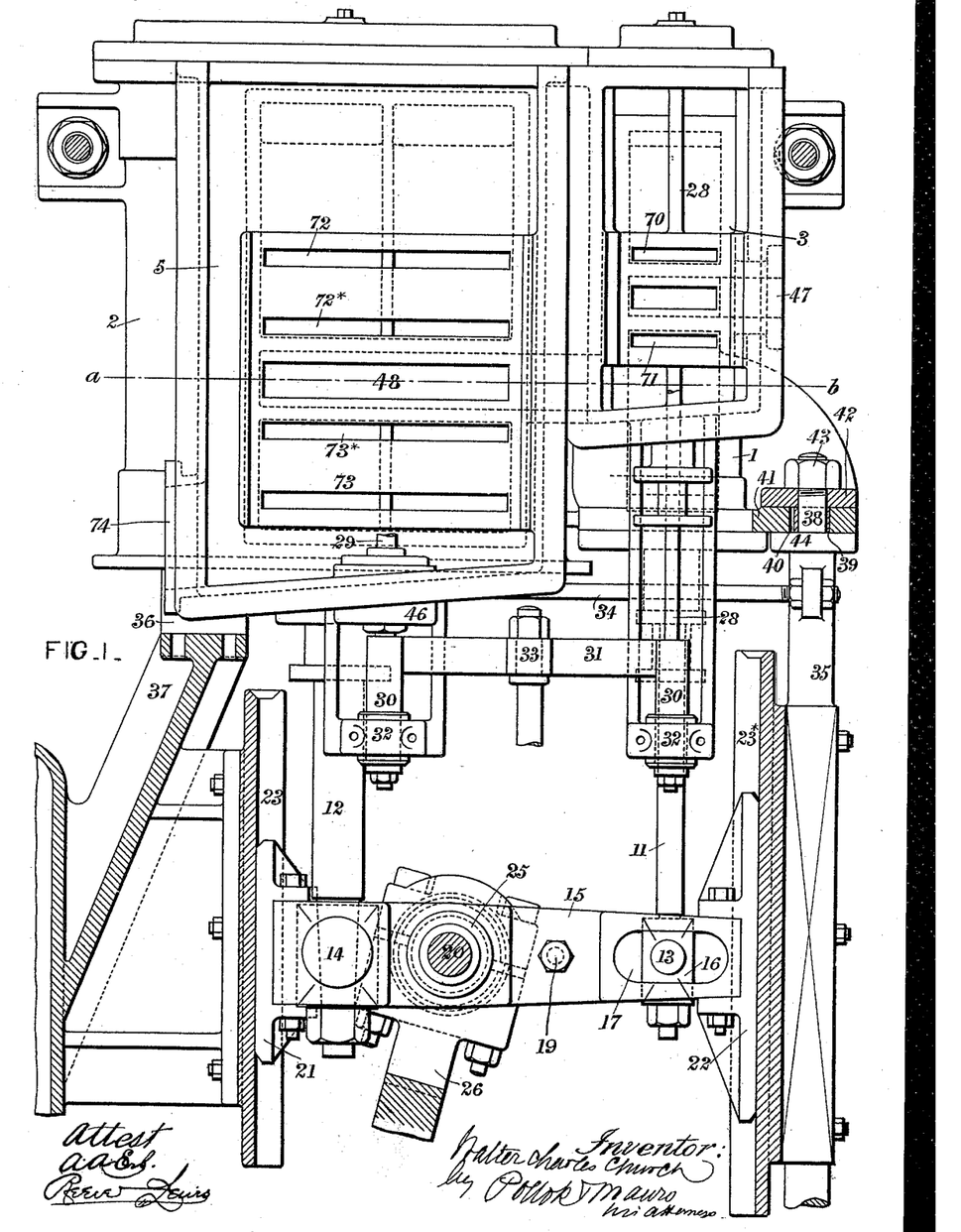
Figure 1 of the drawings represents in elevation partly in section a compound high and low pressure engine, constructed according to my invention, the covers of the valve chests being removed.
Figures 2, 2A:
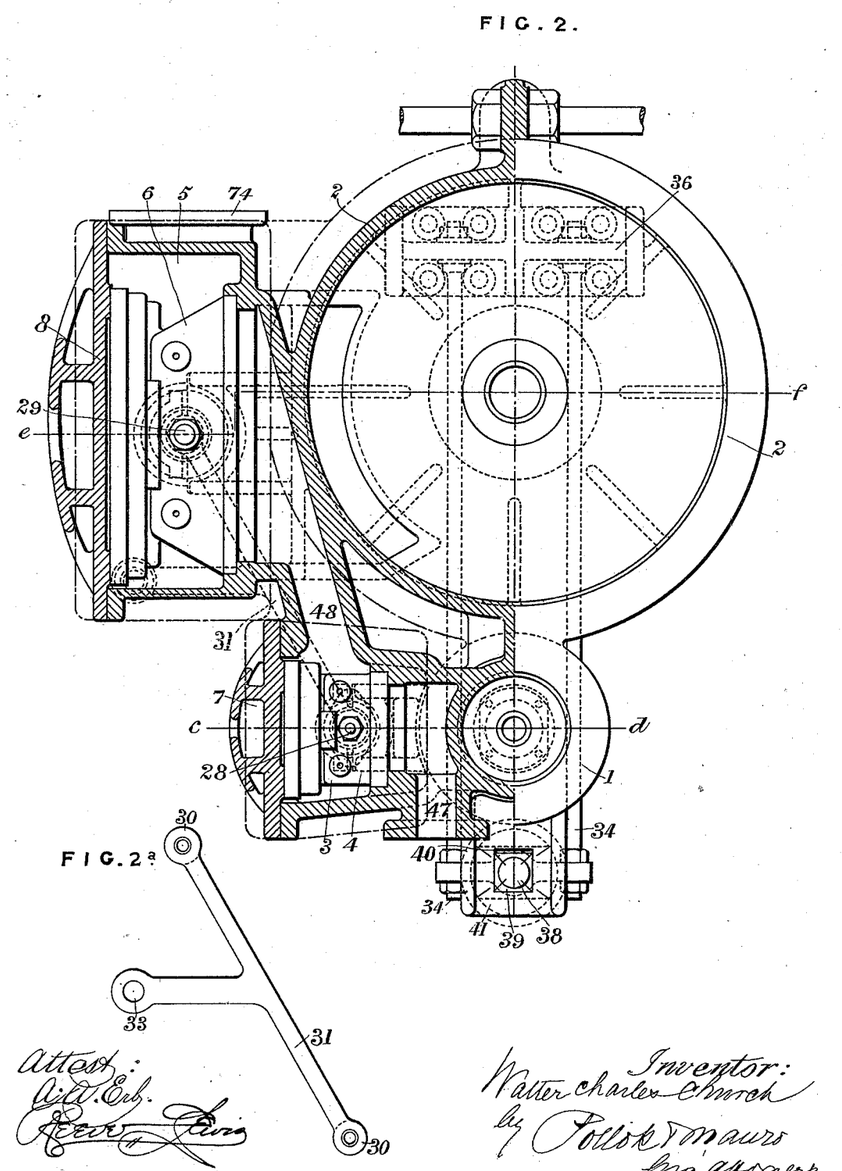
Figure 3:
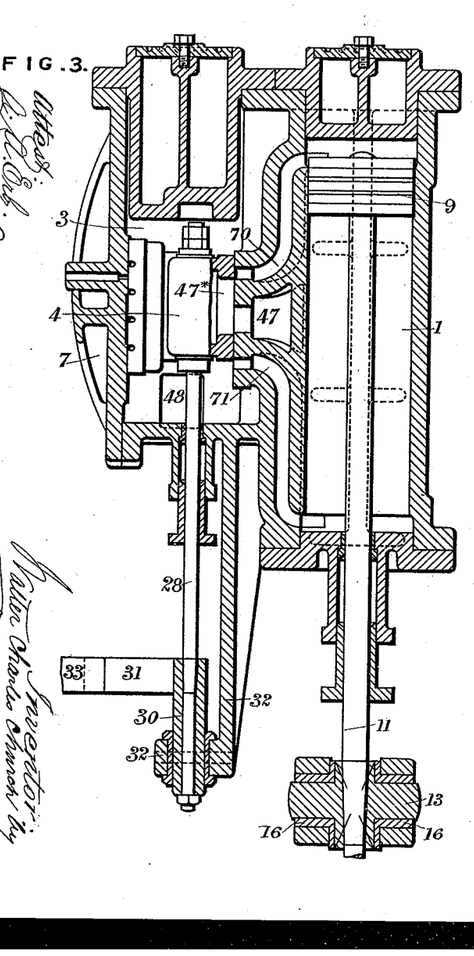
Fig. 3 is a vertical section of the high pressure cylinder and its valve chest, the section being taken along the line $c\,d$ in Fig. 2.
Figure 4:
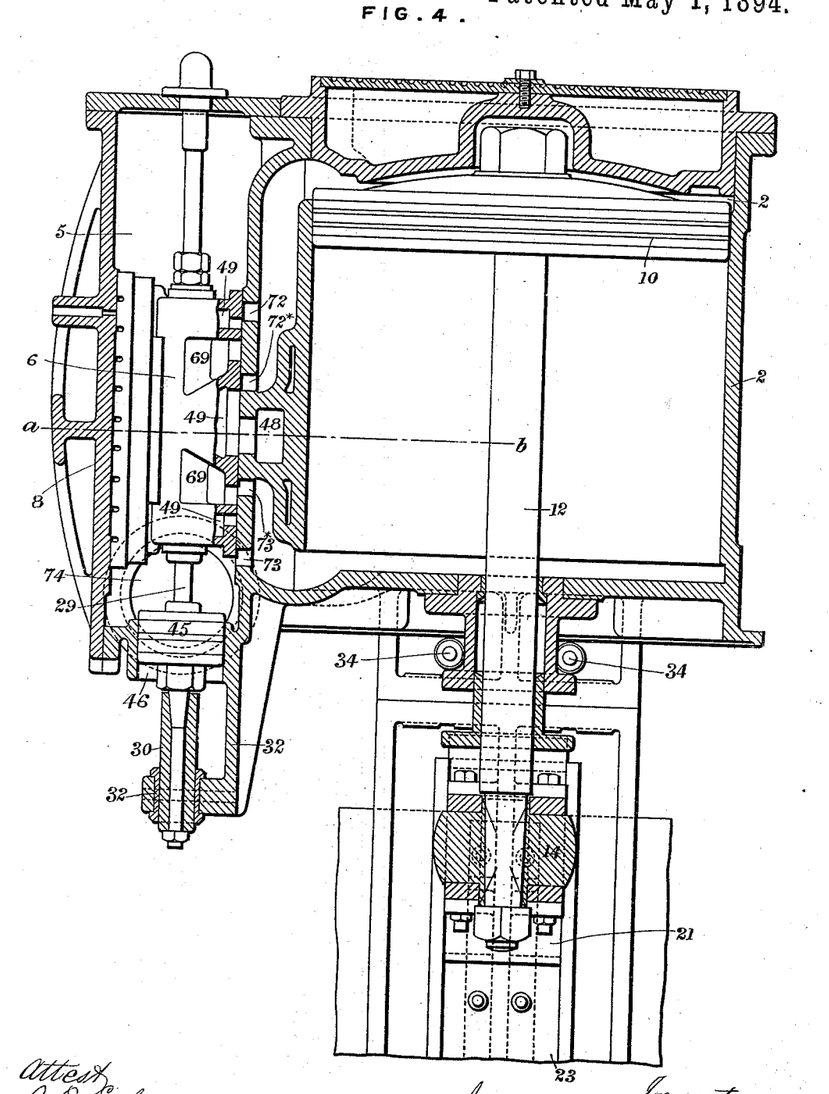
Fig. 4 is a vertical section of the low pressure cylinder and its valve chest, the section being taken along the line $e\,f$, Fig. 2.

The spindles 28 and 29 of the valves 4 and 6 are connected to sleeves or arms 30 formed on the opposite ends of a crosshead 31, shown detached in Fig. 2$^A$, which sleeves or arms are fitted to slide in guides 32, shown in Figs. 1, 3, and 4, as being cast on the valve boxes 3 and 5, but which may be attached thereto or to any other suitable part of the engine. This crosshead is connected at 33 to the mechanism by which the valves are worked, and may be made in one piece, as shown in Fig. 2$^A$; but it is not necessary here to further describe this arrangement as it is fully set forth in my application hereinbefore referred to.

Figure 9:
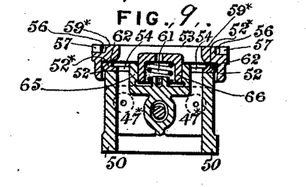
Fig. 9 is a section of the high-pressure valve taken along the lines $g\,h$, Fig. 7.
Figure 10:
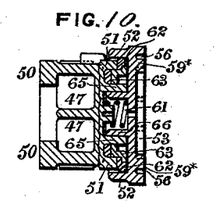
Fig. 10 is a compound section taken along the lines $i\,k\,l\,m$ in Fig. 7.
Figure 11:
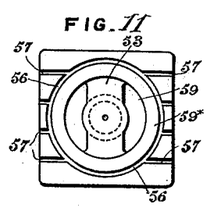
Fig. 11 and 12 are respectively views of the face and back of the cap of the high pressure slide valve.
Figure 12:
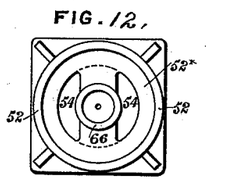
Figure 13:
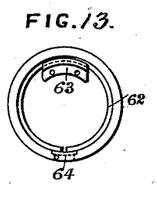
Fig. 13 is an elevation and Fig. 14 a transverse section of the spring packing ring interposed between the cap and back of the high pressure valve.
Figure 14:
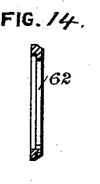
Figure 15:
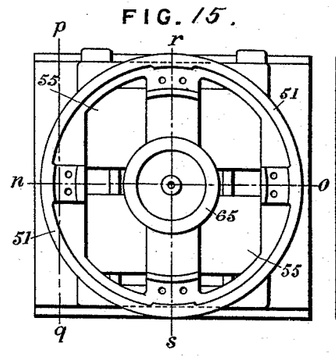
Fig. 15 is a view of the back of the low pressure slide valve with its cap removed.
Figure 16:
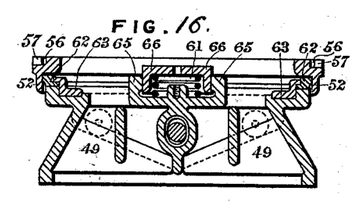
Fig. 16 is a section of the same taken along the line $n\,o$, Fig. 15.
Figure 17:
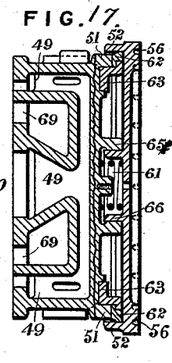
Fig. 17 is a compound section taken along the lines $p\,q$ and $r\,s$, Fig. 15.
Figure 18:
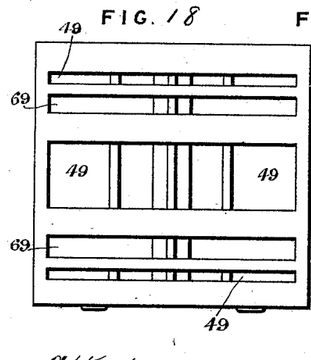
Fig. 18 is a view of the face of the low pressure valve.
Figure 19:
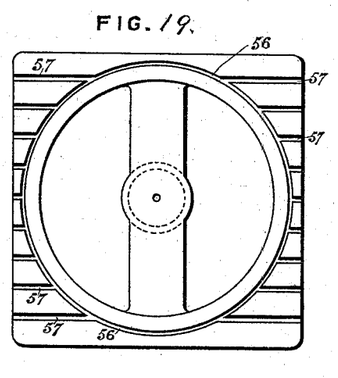
Figs. 19 and 20 are respectively a face view and a back view of the cap of the low pressure slide valve.
Figure 20:
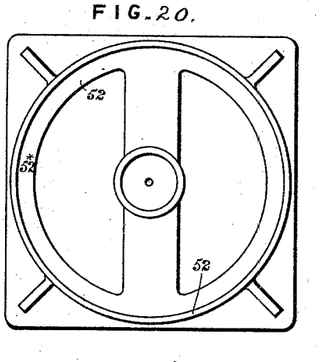
Figures 21, 22:
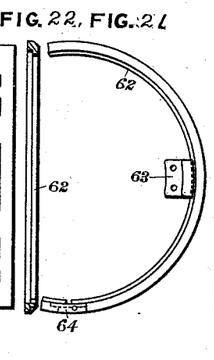

When the cylinders 1 and 2 of a condensing engine are arranged above or below the crank (in Figs. 1 to 4 of the drawings I have shown them arranged above the crank) I balance the weight of the slide valve 6 of the low pressure cylinder by means of a piston 45 fixed on the spindle 29 of the said valve 6, and working in a cylinder 46 which may be cast in one with the valve chest or case 5, as shown in Fig. 4, or which may be made separate therefrom, and be connected thereto in any suitable manner. One end of this cylinder is open to the interior of the valve chest while the opposite end is open to the atmosphere, so that as the pressure in the valve chest 5, and consequently on the inner face of the piston 45, is below the atmospheric pressure acting on the outer face of the piston, the excess of the atmospheric pressure serves to sustain the weight of the slide valve. Steam from the boilers is admitted by the passage 47, Figs. 1, 2 and 3, and enters the cavity $47^*$ in the high pressure valve 4, while the exhaust steam from the valve chest 3 passes by a passage 48 (shown clearly in Fig. 2) into the cavity or cavities 49 in the valve 6 of the lower pressure cylinder 2 (see Fig. 4 and also Figs. 16, 17 and 18 hereinafter referred to.) The internal capacity of the high pressure valve and cap forms the high pressure steam chest, and the internal area of the cap is greater than the area of the valve face in contact with the port face of the cylinder, so that the pressure tending to keep the valve to the port face of the cylinder is greater than the pressure tending to force it from the said port face, and thereby its tightness is insured. The valve 4 of the high pressure cylinder is preferably of rectangular form on its working face 50, as shown in Figs. 7, 8, 9 and 10, and has on its back an annular projection or rim 51, over which fits a rim 52 of annular form (as shown in Fig. 12) on the cap or back plate. The face of this cap or back plate, which works against the interior of the cover of the valve chest, is of rectangular form on the exterior, but has a recess 53 therein, communicating by openings or passages 54, with the cavity or cavities 55 in the valve. In this face of the cap or back plate is an annular groove 56, with which are connected other grooves 57 in the face arranged at right angles to the direction of motion of the valve, and extending from the annular groove 56 to the edges of the cap, so that as the surface of the cap rubs against the raised bearing surface 58 on the interior of the valve chest or its cover (Fig. 5), should any fluid leak past the edge 59 of the bearing surface $59^*$ of the cap, it will enter the annular groove 56 and pass to outside the valve by the grooves 57 without affecting the balance of pressure. The grooves 56 and 57 also serve to assist the lubrication of the rubbing surfaces. The surfaces between the grooves serve to increase the bearing surface of the cap against the surface 58 in the valve chest or its cover, whereby should any of the motive fluid enter between the surface $59^*$ and the surface 58, the pressure of the fluid in the interior of the valve and cap, acting on the larger diameter or internal annular surface area $52^*$ of the cap, will prevent the cap from being forced from the surface 58. The middle part of the projecting bearing surface 58 is recessed as shown at 60, Fig. 5, the edges of this recess being so shaped that the inner edge 59 of the bearing surface of the cap will, at each stroke of the valve, overpass the edge of the recess 60, as will also the outer edge of the face of the cap overpass the outer edges of the projecting surface 58, and thus the formation of ribs or shoulders by wear on the rubbing surfaces is prevented. The contiguous surfaces of the cap and the valve chest or cover are maintained in contact (when no pressure is admitted to the cavity in the valve) by a spring 61 inclosed in the hollow boss 66 on the under side of the cap, which boss enters a similar hollow boss 65 formed on the back of the valve. Between the top surface or edge of the annular projection or rim 51 on the back of the valve and the inner surface of the cap inside the rim 52 is interposed a spring packing ring 62 (shown detached in Figs. 13 and 14) held in position by brackets 63, shown in section in Fig. 10 and in plan in Fig. 13. The outer circumference or periphery of this packing ring is beveled, as shown in Figs. 9, 10 and 11, for the purpose of reducing the area of the outer diameter of the packing ring to less area than the inner diameter of the said ring, so that the pressure on the interior of the ring presses the outer circumference into tight contact with the interior surface of the rim 52, and also so that the pressure on the face of the ring contiguous to the cap (which face is of greater area than the face next the annular rim 51 on the valve) will force the ring into tight contact with the top edge of the said rim 51, and prevent leakage of the pressure thereat. The spring packing ring is divided at one part in its circumference to admit of its expansion, the division being covered by a piece 64 fixed by one end to the ring on one side of the division but free at the other end. The external surface of the hollow boss 66 containing the spring 61, or the internal surface of the boss 65, is slightly convex, or both the exterior of the boss 66 and the interior of the boss 65 may be convex, so as to admit of the valve and its cap moving to accommodate themselves to unparallelism between the port face of the cylinder and the surface against which the cap works, and also to allow either end of the valve to be raised from the port face to relieve undue compression which may take place in the cylinder by the completion of the stroke of the piston compressing water contained in the cylinder after the exhausting port or ports is or are closed by the valve.

This undue compression may arise from priming of the boiler or boilers, or by starting the engine with excess of water in the cylinder, which would be compressed by the piston when completing its stroke. The fracturing of the cylinder, or the blowing off of the cylinder cover or covers, and damage to the piston or its rod, is thus prevented, while the ordinary snifting valves employed for this purpose may be dispensed with.

The cap and balancing mechanism of the low pressure valve are the same in construction as those of the high pressure valve hereinbefore described, as will be seen on referring to Figs. 15 to 22, the difference being in the dimensions. The valve is double-ported to suit the ports in the port face of the low pressure cylinder, as shown in Figs. 1 and 4. I have marked the corresponding parts in both valves and their caps with the same numerals. The internal area of the cap of this low pressure valve, with reference to the area of working surface or surfaces of the valve face, should be such that the pressure acting on the back of the valve, tending to keep the valve on the port face or faces of the cylinder, is greater than the pressure tending to force the valve from the said port face. 69 are the exhaust ports or passages in the valve. Either end of this valve may be raised from the port face to relieve undue compression which may take place in the cylinder in the same manner as described with reference to the high-pressure valve.

The engine works as follows:—The pistons 9 and 10 being at the end of their inward or top stroke, and the valves 4 and 6 just opening to admit steam to the back or top sides of the pistons, as shown in Figs. 3 and 4, and moving in the reverse direction to that of the pistons at this period of the stroke, live steam admitted at 47 enters the cavity 47* of the valve 4, and passes by the port or passage 70 to the top or inner end of the cylinder 1, and acting on the piston 9 drives it toward the opposite or back end of the cylinder, the exhaust steam from the opposite side of the piston passing out of the cylinder by the port or passage 71 into the valve chest or casing 3, and out therefrom by the passage 48 into the cavity or cavities 49 of the valve 6 of the lower pressure cylinder 2. The valve 6 is a double-ported valve (as hereinbefore described), and the ports 72, 72*, as shown are just opening to admit the exhaust steam passing from the valve chest or casing 3 to the top or back of the piston 10 to drive the piston toward the outer or downward end of the cylinder 2. As the area of the piston 10 is considerably greater than the area of the high pressure piston 9, the whole or nearly the whole of the pressure is taken by the outward or downward movement of the piston 10 from the valve chest or casing 3 by passage 48 and the interior cavity of the valve 6, and at the same time the pressure is removed from the back of the high pressure piston 9 and also from the high pressure valve rod or spindle 28. The exhaust steam from the opposite side of the piston 10 passes by the ports 73, 73* into the valve chest or casing 5, and out therefrom to the atmosphere, or to a condenser by the pipe or passage 74. If the exhaust steam from the casing 5 passes to the atmosphere, the pressure on the valve spindle will only be momentary, but if it passes to a condenser, the valve spindle will be in a vacuum. The same operations as those described will take place when the valves are reversed to admit steam to the opposite sides of the pistons, the steam from the high pressure valve chest 3 passing then through the passage 48 as before into the cavity of the valve 6, and therefrom through the ports 73, 73* into the cylinder 2, the exhaust steam from this cylinder passing through the ports 72, 72* into the valve chest 5, and thence through the pipe or passage 74 into the atmosphere or into a condenser as before.

Having now particularly described and ascertained the nature of my said invention and in what manner the same is to be performed, I declare that what I claim is—

1. In a compound steam engine the combination with high and low pressure cylinders arranged side by side, or parallel to one another, and pistons in said cylinders all adapted to operate simultaneously in the same direction, of a valve for the high pressure cylinder having its interior cavity in communication with the live steam supply, a separate valve for the low pressure cylinder having an interior cavity, and means for supplying the cavity of the valve to the low pressure cylinder with steam direct from the valve chest of the higher pressure cylinder, substantially as described.

2. In a compound condensing steam engine, the combination with the valve of the low pressure cylinder, and the valve casing, of a cylinder or passage communicating at one end with the interior of the valve casing and at its other end with the atmosphere, and a piston connected with the valve and working in said cylinder or passage whereby the atmospheric pressure on the piston serves to sustain, in whole or in part, the weight of the valve, substantially as described.

3. In a compound steam engine, the combination with high and low pressure cylinders arranged side by side or parallel to one another, pistons in said cylinders, and piston rods for the pistons all connected to a single cross-head, of a valve for the high pressure cylinder having its interior cavity in communication with the live steam supply, a valve for the low pressure cylinder having its interior cavity supplied with exhaust steam from the higher pressure cylinder, the exhaust steam passing from the cavity of the low pressure valve into the low pressure cylinder simultaneously with the admission of live steam into the high pressure cylinder, the steam being admitted to each cylinder upon corresponding sides of the pistons to cause both or all of the pistons to move in the same direction, substantially as described.

4. In a compound steam engine the combination with high and low pressure cylinders arranged side by side or parallel to one another, pistons in said cylinders and piston rods for the pistons all connected to a single-crosshead, of a valve for the high pressure cylinder having its interior cavity in communication with the live steam supply, a valve for the low pressure cylinder having its interior cavity supplied with exhaust steam from the higher pressure cylinder for admitting it to the lower pressure cylinder simultaneously with the admission of live steam into the high pressure cylinder, the steam being admitted to each cylinder upon corresponding sides of the pistons, to cause them to travel in the same direction and valve rods for the valves of the respective cylinders all connected to a single cross-head, substantially as described.

5. In a compound steam engine, the combination with the high and low pressure cylinders each having a valve chest into which the steam from the cylinder exhausts, the bottom of each valve chest being on its inner face or surface inclined toward an exhaust passage, the exhaust passage of the high pressure valve chest leading from the interior cavity of the valve to the low pressure cylinder, substantially as described.

6. In a steam engine, the combination with the valve chest or casing, of a slide-valve having live steam admitted to the interior thereof, and a cap or cover fitting over the back of said valve, said cap or cover having a rectangular bearing surface which bears against the internal surface of the chest or casing, substantially as and for the purpose set forth.

In testimony whereof I have signed my name to this specification in the presence of two subscribing witnesses.

W. C. CHURCH.

Witnesses:
   EDWD. GEO. DAVIES,
   CHAS. MILLS,
*Both of 47 Lincoln's Inn Fields, London, W. C.*